Sept. 3, 1957 R. L. ALTSCHULER 2,804,672
MACHINE FOR MANUFACTURING BUILDING PANELS
Filed May 28, 1956 3 Sheets-Sheet 1
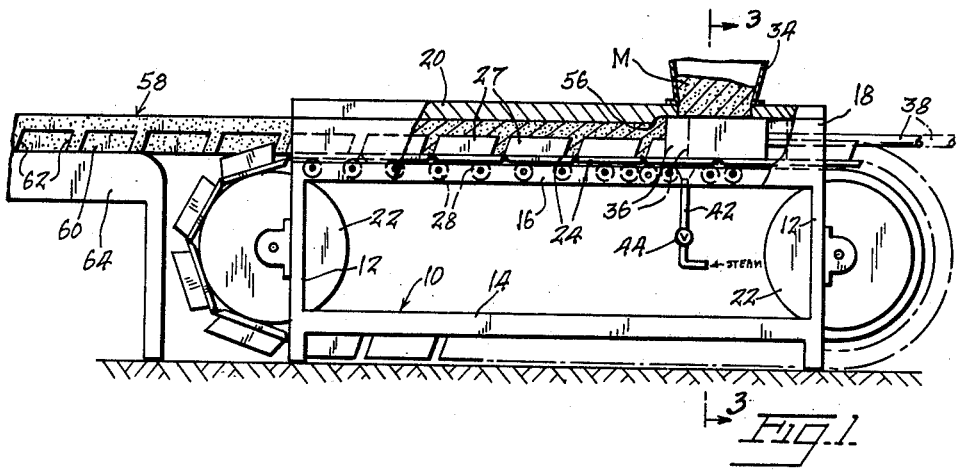
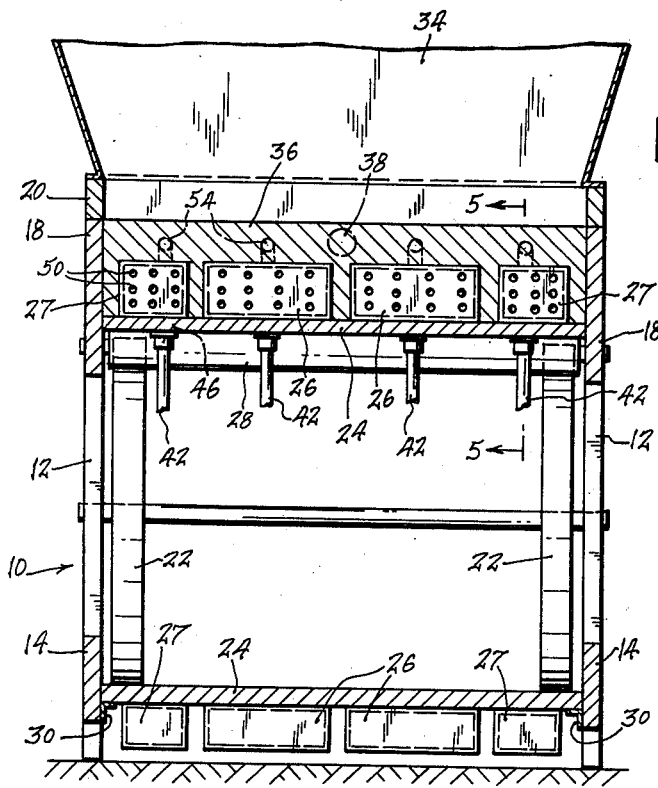
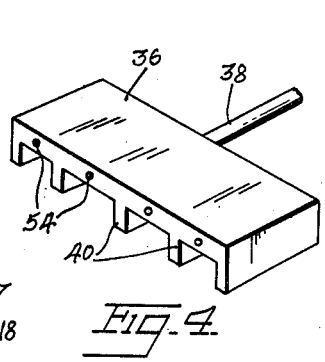
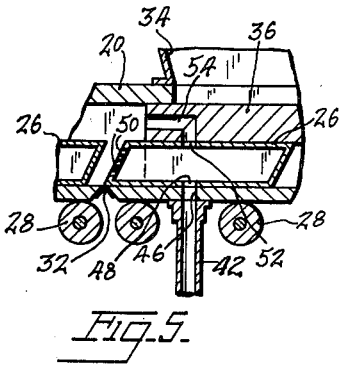
INVENTOR
ROBERT L. ALTSCHULER
BY
ATTORNEY

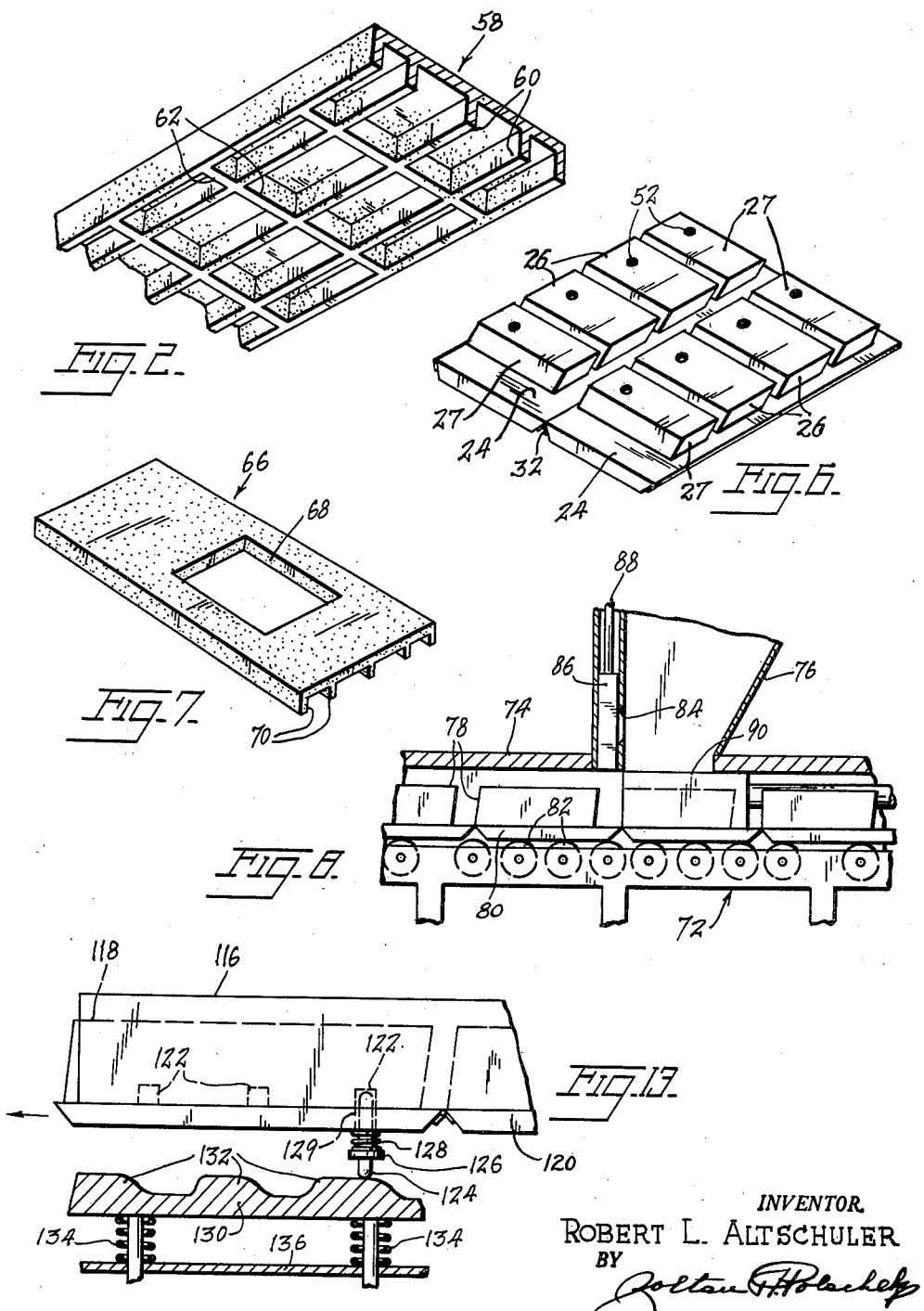

Sept. 3, 1957  R. L. ALTSCHULER  2,804,672
MACHINE FOR MANUFACTURING BUILDING PANELS
Filed May 28, 1956  3 Sheets-Sheet 3
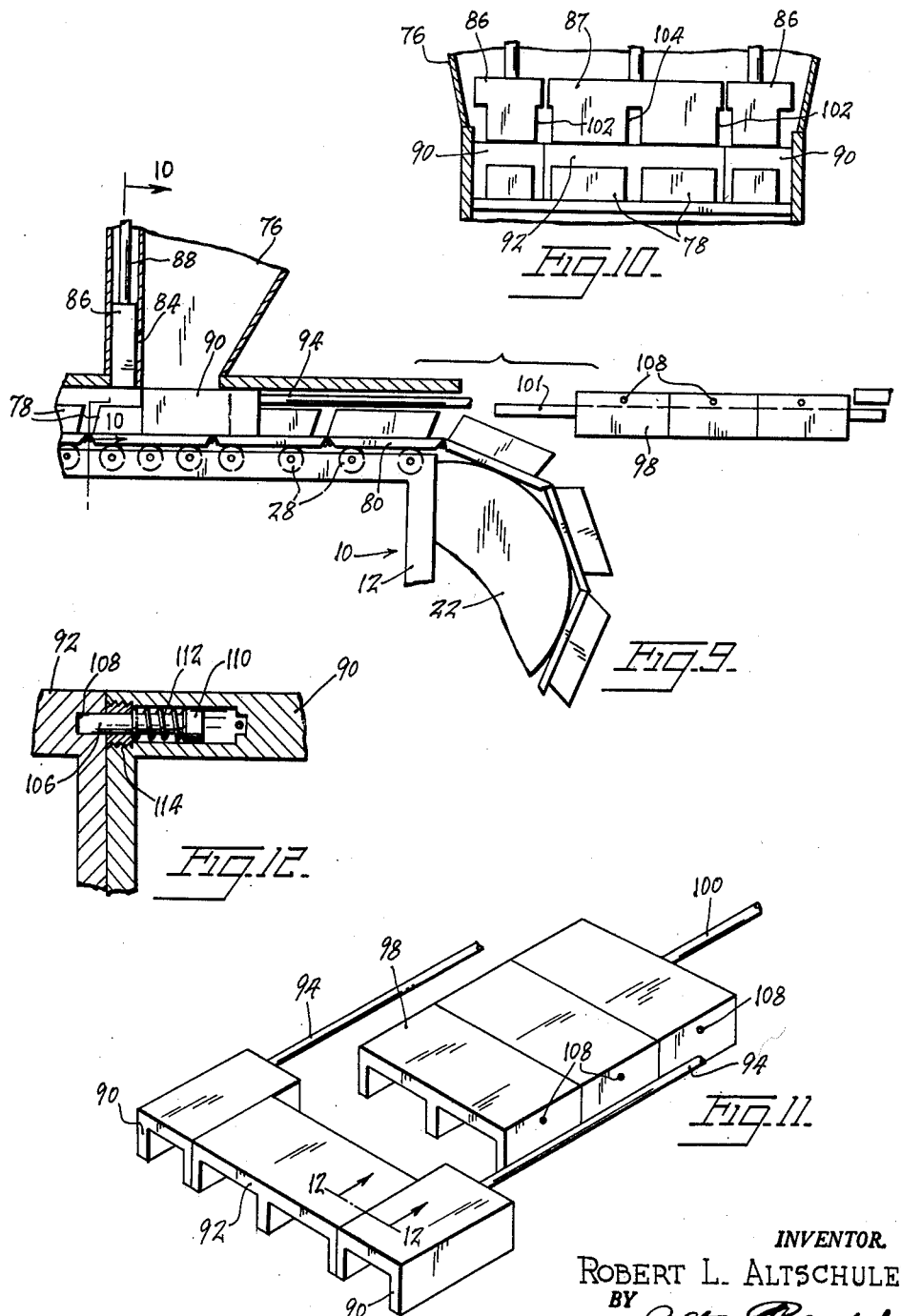
INVENTOR.
ROBERT L. ALTSCHULER
BY
ATTORNEY

United States Patent Office 2,804,672
Patented Sept. 3, 1957

2,804,672

MACHINE FOR MANUFACTURING BUILDING PANELS

Robert L. Altschuler, Bronx, N. Y.

Application May 28, 1956, Serial No. 587,617

6 Claims. (Cl. 25—99)

Summarized briefly, the present invention is an apparatus for manufacturing building panels, including a hopper for feeding, by gravitation or otherwise, a quantity of a moldable material such as wood chips, cementitious materials, and other bulk materials and binders, to a passage within which travels an endless belt having thereon a series of laterally and longitudinally spaced blocks. The longitudinal spacing of the blocks is adapted to define transverse ribs on the completed panel, and reciprocating in the passage below the hopper, in a manner to assure a controlled feed of the material to the passage, is a ram traveling in the same path as the blocks and channeled longitudinally to prevent interference between the blocks and ram. The ram is adapted to effect, in cooperation with other means that may be provided, such as a restriction in the passage or a plurality of pistons, molding of the material about the blocks within the passage. The transverse spacing of the blocks defines longitudinal ribs in the completed panel, and the end product is a panel issuing from the apparatus as a continuous web and formed on one face thereof with integrally connected transverse and longitudinal reinforcing ribs.

The main object of the invention is to provide a machine adapted for the inexpensive and rapid manufacture of a continuous panel particularly adapted for use in the building industry in the erection of walls, ceilings, etc. The continuous panel web, after leaving the machine, can be cut to any desired length, and when used in the erection of a building structure, provides not only a wall surface, but also means, in the form of the longitudinal and transverse ribs, corresponding to the studs and cross braces of conventional building construction.

A further object of importance is to provide apparatus of the type referred to which, with suitable modifications, can be employed for forming window or door panels, that is, panels having openings pre-shaped to receive window and door frames.

Another object is to provide apparatus of the character described that will be of simple design, will be operable with a minimum amount of attention on the part of a worker, and will be adapted to provide a particularly strong panel despite the use of extremely inexpensive materials, with all these factors combining to provide an end product of low cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a partly diagrammatic side elevational view of the apparatus in which portions have been shown in longitudinal section.

Fig. 2 is a fragmentary bottom perspective view of the continuous panel web formed by the machine.

Fig. 3 is an enlarged transverse sectional view on line 3—3 of Fig. 1.

Fig. 4 is an enlarged perspective view of the ram per se.

Fig. 5 is a detail sectional view on line 5—5 of Fig. 3.

Fig. 6 is an enlarged perspective view of a portion of the cleated belt.

Fig. 7 is a perspective view of a modified panel having a window opening.

Fig. 8 is a fragmentary longitudinal sectional view showing a modified construction.

Fig. 9 is a fragmentary, partly exploded longitudinal sectional view of a second modification of the apparatus, used for forming the panel of Fig. 7.

Fig. 10 is a transverse sectional view on line 10—10 of Fig. 9.

Fig. 11 is an exploded perspective view of the ram assembly used in the modification of Fig. 9.

Fig. 12 is an enlarged, detail sectional view on line 12—12 of Fig. 11.

Fig. 13 is a greatly enlarged, fragmentary longitudinal sectional view through another modification.

Referring to the drawings in detail, the machine is primarily intended for use in forming panels made of a resin-bonded wood chip material, but the design of the machine is such as to permit it to be used in forming panels of concrete or other cementitious materials, plastic, or other bulk materials and binders. As will presently appear, the manufacture of the panel involves a modified form of extrusion.

In the form of the machine shown in Figs. 1 and 3–6, the apparatus includes a rectangular, elongated, open support frame generally designated 10 having corner legs 12, lower side rails 14 extending horizontally between and fixedly connected to the lower portions of the corner legs at opposite sides of the machine, upper side rails 16 extending horizontally between and integrally or otherwise made rigid with the corner legs at the upper ends of the corner legs, vertical side walls 18 integral with and projecting upwardly from the side rails 16, and a horizontally disposed top plate 20 providing a roof for the passage within which the panels are molded.

Mounted upon opposite ends of the frame for rotation about horizontal axes extending transversely of the frame are pairs of wheels 22 about which is trained an endless belt. The belt comprises a series of flat cleat support plates 24 each extending the full width of the frame between the side walls 18 as shown to best advantage in Fig. 3. The leading and trailing edges of the cleats are oppositely beveled as shown to best advantage in Figs. 1 and 6 (Fig. 6 showing a portion of the belt per se), the purpose of this arrangement being to permit the plates 24 to move into angular relationships to one another at opposite ends of the apparatus as they come into engagement with and travel about the circumference of the wheels 22 (see Fig. 1).

On each plate 24 there is mounted a series of blocks 26, 27. As shown in Fig. 6, in the illustrated example there are provided on each plate two blocks 26, and two blocks 27. The blocks 26 are substantially wider in the illustrated example than the blocks 27, so as to space the longitudinal ribs of a completed panel a greater distance apart along the midwidth area of the panel than are the ribs at the opposite side portions of the panel. The particular dimensions, spacing, and number of the blocks can, however, be varied without departure from the spirit of the invention as hereinafter claimed.

Further, as will be noted from Fig. 5, the blocks when viewed in longitudinal section or, for that matter, in side elevation are rhomboidal, with inclined leading and trailing walls, designed to impart a corresponding inclination to the transverse ribs of the completed panel. Again, this particular shape may, it is believed, be varied while yet retaining the principles of the invention if, for example, it is desired that the transverse ribs of the panel lie in planes normal to the plane of the body or facing portion of the panel. In this event, the blocks or cleats, when viewed in longitudinal section, would be of rectangular configuration.

It is further of importance to note, both from Figs. 1 and 6, that the leading ends of the blocks are flush with the leading edges of their associated support plates 24, with the trailing ends of the blocks being spaced forwardly from the trailing edges of said plates 24.

The upper flight of the endless belt, as shown in Fig. 1, is supported upon transversely extending idler rollers 28, spaced longitudinally of and journalled at their opposite ends in the side rails 16. The upper flight of the belt is thus maintained horizontal, without possibility of sagging, and it is preferred as shown in Fig. 1, that the rollers be spaced more closely, below the hopper and ram, than they need necessarily be through the remainder of the length of the apparatus.

The lower flight of the belt is also kept from sagging, and various expedients can be used to this end. For example, in Fig. 3 there are shown guide rails 30 extending longitudinally of the lower side rails 14, to support the opposite side edge portions of the plates 24 of the lower flight of the belt. Obviously, rollers can be mounted upon the frame in place of the guide rails 30, to reduce friction between the belt and frame to a minimum.

The plates 24 are hingedly connected at their abutting leading and trailing edges, by hinge means 32 extending the full width of the belt. To prevent the moldable material from seeping through the spaces between abutting ends of the plates 24, piano hinges may be employed, it being important that the upper flight of the belt define a continuous, unbroken floor within the mold chamber or passage.

Adjacent the rear end of the apparatus, an opening is formed in the top plate 20, extending the full width of the mold chamber, and projecting upwardly from said opening and secured to the top wall is a downwardly tapering hopper 34 containing a quantity of moldable material M such as wood chips supplied with a resin binder. In the illustrated example the material M feeds into the mold chamber by gravity in the Fig. 1 form of the invention. However, downward pressure can be exerted on all or a portion of the material M, to feed the same to the mold chamber.

Horizontally reciprocating within the mold chamber at the inlet end thereof, below hopper 34, is a ram assembly shown to best advantage in Figs. 3 and 4. This includes a ram 36 having a flat, horizontal surface slidably contacting the underside of the top plate 20 of the mold chamber. The ram extends the full width of the mold chamber, with its opposite sides in slidable contact with the side walls 18, and secured fixedly to and extending rearwardly from the ram 36, beyond the inlet end of the mold chamber, is a piston rod 38.

Although not shown, it will be understood that any of various suitable means can be employed for effecting reciprocating motion of the piston rod 38. Such means may be hydraulic or mechanical, may be operated by air pressure, or may be a combination of any of these. Since means for providing for controlled, horizontal reciprocation of rams are well known in many arts, and since a wholly conventional means of this type can be employed, it is not believed necessary to illustrate the same herein.

As shown in Figs. 3 and 4, the ram includes a thick top plate of rectangular formation lying in a horizontal plane, integral with depending, laterally spaced ribs 40 lying in vertical planes and extending in a fore-and-aft direction from the leading to the trailing edges of the ram. The provision of the ribs defines downwardly facing channels on the ram, snugly receiving the cleats or blocks 26, 27 as shown in Fig. 3.

Thus, the rams and blocks, during operation of the device, define an unbroken wall preventing back flow of the material, with said wall being constituted in part by the cleats, which are moving in transversely spaced relation longitudinally of the mold chamber while also being spaced longitudinally of the mold chamber, and in remaining part being constituted by the ram, which has a horizontal reciprocating motion in a path paralleling those within which the blocks are moving.

As will be noted by comparison of the full and dotted line positions of Fig. 1, the ram has a relatively short stroke, and when fully retracted is in the dotted line position, in which position it partially uncovers the discharge opening of the hopper 34, so as to permit a controlled amount of the material M to gravitate into the mold chamber in advance of the ram. Then, when the ram moves in its forward stroke to the full line position, it effects a compressing action against the material disposed in advance thereof, compressing said material about the cleats so that the panel will be molded against the underside of the top plate 20, about the cleats, and against the top surfaces of the plates 24 to a desired shape shown in Fig. 2.

When a resin bonded wood ship material is used for forming panels, it is essential that the compression thereof be accompanied by heat. The heat can be supplied in various ways, as for example by heating the top plate 20 by steam or electricity, with the belt segments, two of which are shown in Fig. 6, also being heated. The belt segments could be heated by gas before getting under the hopper position, and this could be accomplished by building an oven, not shown, around the inlet side of the machine while care is taken to insulate the feed hopper from the oven.

If a foaming plastic, which must be expanded rather than compressed, is used, a plurality of steam pipes 42 can be mounted upon the machine.

Thus, and referring in particular to Figs. 3 and 5, transversely spaced, vertical steam pipes 42, having control valves 44, are extended upwardly and have their outlet ends disposed in the plane of the undersides of the plates 24. The plates 24 are each provided with a transverse series of inlet ports 46, spaced apart transversely of the plates, corresponding to the spacing of the steam pipes. Thus, as each plate 24 passes over the array of steam pipes, its openings 46 will come into register with the oulet ends of the steam pipes, so that a charge of steam is directed through openings 46 into the cleats 26 or 27, through openings 48 provided in the bottom walls of the cleats or blocks in registration with the openings or ports 46 of plates 24.

In the leading walls of the blocks there are provided a substantial number of outlet ports 50, so that a portion of the steam directed into the blocks will be forced under the pressure by means of which the steam is supplied through the ports 50 into the moldable material M. The remaining part of the steam fed as a charge to each block is directed through an opening 52 formed in the top wall of the block into an angular passage 54 provided in the ram 36, and is directed out of the ram into the moldable material in advance of the ram.

In this connection, the passages 54 will be in registration with the openings or orifices 52 simultaneously with or immediately following the registration of port 46 with steam pipe 42. A timed, controlled relationship of the belt movement to the ram movement may be used for this purpose, with these components moving synchronously to effect registration of the several ports and passages at the desired time.

It will further be understood that the admission of steam occurs when the ram nears the end of its compression stroke, that is, when the ram has fully closed the hopper with the steam being cut off immediately following initiation of the back or return stroke of the ram. A suitable valve linkage can be employed to control the steam admission, through a sliding port riding against the bottom of the belt segment, which port whenever steam is not being admitted will be retracted from the belt, and the valve means can derive its control from the motion of the ram.

The steam coming from the face of the ram helps keep the plastic from sticking to the ram and also minimizes the amount of loose material blown about when the ram uncovers the feed port of the hopper. A double hopper can be employed to keep the steam from passing upwardly through the material still confined therein, while said material is awaiting feeding to the belt.

A short distance forwardly from the hopper, there is, as shown in Fig. 1, a transversely extending slope 56 in the underside of the top plate 20, causing a reduction in the distance between the top plate and the cleat support plates 24. This provides a choke or restriction in the mold chamber, designed to effect, in cooperation with the strokes of the ram, a compression of the material M to a desired extent. The choke might not be used when the material is a foaming plastic.

From this, it will be seen that during operation of the device, the material M will be fed to the mold chamber in advance of the ram, and by reciprocation of the ram will be compressed about the cleats, with heat being applied at the same time, so that a panel 58 is formed extending as a continuous web from the outlet or forward end of the apparatus. The building panel includes a facing portion, integral with depending longitudinal ribs 60 resulting from flow of the mold material into the longitudinally extending spaces defined by the transverse spacing of the cleats or blocks. The panel also includes, integral with the facing portion and longitudinal ribs, transverse ribs 62 resulting from flow of the mold material into the spaces defined by the spacing of the blocks longitudinally of the mold chamber.

If desired, a means for driving the belt can be omitted, since as the material compresses about the cleats, it tends to carry the upper flight of the belt forwardly, effecting the continuous movement of the belt.

When the panel moves out of the forward end of the apparatus, the belt begins to travel about the forward wheels 22, while the panel continues movement along a horizontal path, to a table, conveyor, or similar structure 64. Thereafter, the panel can be cured if necessary, and is cut to selected lengths for use in building erection.

Referring now to Fig. 7, there is here shown a modified panel generally designated 66, having a window opening 68. Panels having door openings can also be manufactured, in a manner to be described hereinafter with reference to the window panel. In any event, the window panel is identical to the panel of Fig. 2, except for the window opening 68, and includes longitudinal ribs 70, as well as transverse ribs such as has been previously described with reference to the first panel.

In Fig. 8, there is shown a modified form of the apparatus wherein the choke or restriction defined by the surface 56 is not used. Substituted therefor is a vertical ram or piston assembly, disposed just beyond the maximum point of forward travel of the horizontal ram.

In this form, the frame has been designated at 72, the top plate at 74, the hopper at 76, the blocks or cleats at 78 and the cleat support plates at 80, these riding upon rollers 82. All this is basically similar to the first form of the invention.

In this form, however, the hopper has a vertical forward wall having an inclined opening 84 adjacent the lower, main discharge opening of the hopper. As a result, a quantity of the material gravitates into the lower end portion of a flat, wide chamber extending the full width of the apparatus, in which chamber there reciprocates a series of pistons 86 shown to best advantage in Figs. 8, 9 and 10.

The vertically reciprocating piston assembly 86 is operated by a series of vertical piston rods 88, driven in any suitable manner in their vertically reciprocating motion.

When the space between adjacent, transversely extending rows of blocks 78 is disposed directly under the vertical piston assembly, said assembly including pistons 86, 87 (Fig. 10) lifts, permitting a quantity of the material to pass through the opening 84, and thereafter descends to force said material into the space between the transverse, adjacent rows of cleats 78. This provides sufficient compacting of the material in such spaces, for required strength.

Since the choke or restriction is not used in this instance to create back pressure, the belt itself is employed by gearing from the same power source as is used to drive the horizontal ram, or from a different power source. By controlling the belt travel in relation to ram travel, the density of the finished product is correspondingly controlled. This also makes it possible to obtain accurate indexing so that the space between adjacent transverse rows of blocks 78 is accurately aligned with the line of movement of the vertical pistons or rams when said pistons are actuated.

The vertical pistons can be operated by air or hydraulic pressure, and can be controlled by an electrical solenoid valve, not shown, triggered by a downward projection on the belt segments, said projection also not being shown.

In Figs. 9 and 10 there is shown another modification of the apparatus, used for forming the window panel shown in Fig. 7. Again, almost all components of the apparatus are unchanged from the first form of the invention, and thus the construction is such that the same machine, by interchange of selected components, can manufacture plain panels, panels with window openings, panels with door openings, etc., at the control of the operator.

To permit the manufacture of a panel having a window opening, the ram is modified (see Figs. 11 and 12) and includes side elements or ram members 90, normally disposed at opposite sides of an intermediate ram member 92. Piston rods 94 extend rearwardly from side members, and are driven in a horizontally reciprocating motion by suitable means, not shown. During the manufacture of a plain panel, the side members and the intermediate member 92 are connected as a single unit, and the apparatus operates in the manner previously described herein.

When it is decided to make a door or window opening, the intermediate ram member 92 is disengaged from the side members, and hydraulically or pneumatically actuated means applies pressure to a string or series of auxiliary ram members 98 behind the member 92, a piston 100 extending rearwardly from said series for the purpose of applying pressure thereto independently of the pressure applied to the side members 90. The pressure may be exerted directly against member 92, instead of through members 98.

The pressure applied through the medium of the piston 100 is adapted to impart forward travel to the members 98 upon guide rails 101 (Fig. 9), so that said auxiliary ram members move in back of the member 92 and exert a forward pressure thereagainst. This pressure holds the member 92 against the already completed, compacted chip resin mixture. The two side ram members 90 continue to reciprocate, building up new material. As the new side material is built up, the intermediate members 92, 98 move forwardly and fill the desired portion of the mold chamber to define the window opening 68. The length of the window opening is any multiple of the front to back dimensions of the members 92, 98.

If insufficient intermediate ram members 92, 98 are available, the actuating means 100 of said members is retracted and additional members are placed upon the guide rails and pressure again supplied. The members 92, 98 are released from the panel after the cured panel comes out of the mold and are then returned to the guide rails by hand or by mechanical means, not shown in view of the desirability of simplifying the drawing and emphasizing mainly the principles of operation.

It should be noted, in this connection, that when panels are being formed with door or window openings, the vertically reciprocable piston assembly is not used. The piston assembly cannot be used under these circumstances, of course, since it would tend to compact material against the top surfaces of the intermediate ram members, with there being no outlet for such material.

The pistons 86, 87 (see Fig. 10) are of course so formed as to not interfere with the formation of the longitudinal ribs in the completed panel. Accordingly, there are provided a pair of side pistons 86 and a center piston 87 which is substantially larger, in a direction transversely of the piston assembly, than the respective pistons 86. The pistons 86 have recesses confronting side recesses on the piston 87, to define slot-like openings 102 registering with the spaces between the blocks of the respective transverse rows carried by the support plates. Further, piston 87, intermediate its opposite sides, has a slot-like, downwardly opening recess 104 also registering with a space between adjacent blocks or cleats 78 of a row.

The means whereby the intermediate ram member 92 is releasably connected to the side ram members 90 is shown in Fig. 12, and as will be noted, at opposite sides of the intermediate member 92 there is provided a recess 108, similar recesses 108 being provided in the members 98. A plunger 106 normally extends into the recess 108 to interlock the members 90, 92, and at its opposite end has a head 110 engaged by one end of a compression spring 112 circumposed about the plunger and bearing at its other end against a plug 114 closing the outer end of a plunger-receiving recess of the member 90. The members 90, 92 are thus releasably interlocked for joint movement, but whenever window openings are to be formed, the plunger 106 is retracted. The retraction of the plunger can be effected in various ways as, for example, by solenoid operation, and it is believed that the manner in which this can be accomplished is sufficiently within the skill of those working in the art as not to require separate illustration herein.

Referring now to Fig. 13, in this form of the invention there is shown an arrangement wherein the ram derives its horizontally reciprocating motion by alternately locking itself to and disengaging from the belt. In this form, the ram has been designated at 116, while the cleats have been designated at 118. The cleats are mounted upon plates 120, and formed in the underside of the ram are downwardly opening recesses 122 spaced longitudinally of the path of travel of the ram. A plunger 124 includes a collar 126, against which bears one end of a coil spring 128, the other end of which bears against the underside of plate 120, which carries the plunger with it to define the forward movement of the belt, the plate 120 having an opening 129 in which the plunger is freely slidable, with said opening being registerable with a recess 122 of the ram.

The lower end of the plunger bears against a cam plate 130 stationarily mounted within the frame, that is, mounted against movement in the direction of the path of travel of the belt. The cam plate 130 has on its top surface cam ridges 132 spaced longitudinally of said path of travel so that the plunger 124 alternately rises and falls as the belt moves along the cam plate, so as to alternately engage and disengage the plunger and the ram.

When the plunger begins to ride up on one of the cam ridges 132 it is lifted against the tension of the spring 128 to engage in a recess 122 of the ram.

When the belt and ram have traveled in the direction of the arrow in Fig. 3 a short distance (in a preferred embodiment approximately 3½ inches) the plunger arrives at a depression between adjacent cam ridges 132, which results in disengagement of the plunger or pin from the ram. The ram has associated therewith a retraction spring, not shown, which pulls the ram back to starting position. Soon thereafter the pin engages the next cam ridge 132 and moving upwardly once again, engages in recess 122 to effect the next forward stroke of the ram.

The net result is to provide a continuously moving belt and a ram that has horizontal reciprocation through a stroke of predetermined length, with the return stroke being comparatively rapid.

It will be understood, with reference to the steam supplying means shown in Fig. 3, that said means is employed only in connection with the formation of building panels from a particular material which expands under the action of steam to form a lightweight foam that hardens during curing of the panel. The material is a polystyrene, known in the art of plastic compositions, which is introduced into a mold in the form of powder and, when heated, preferably with steam, expands to form a lightweight foam which hardens when cured.

The significant difference between such material and resin bonded wood chips is that whereas the wood chips need compression for proper forming, the foam needs controlled expansion. As a result, although in the manufacture of panels from wood chips the rate of belt travel is a fraction of the ram rate of travel, when foam material is used the belt travels an additional amount to allow for expansion of the plastic beads of which said foam is comprised.

Thus, panels formed of the foam substance would be made with blocks perforated as shown in Fig. 3, and with steam supplied to the foamy material through said perforations and through the passages 54 of the ram. When wood chip panels are being formed, the blocks would not be perforated, nor would be the ram, and there would merely be supplied heat in any suitable manner, designed to heat the blocks and the top plate of the mold.

With reference to the lock pin means shown in Fig. 12 for engaging the intermediate ram member 92 with a side member 90, the locking means shown in Fig. 13 could be used for the purpose of locking the intermediate member 92 directly to the belt, rather than utilizing a pressure means 100 for the purpose of advancing the intermediate members through the length of the machine. In this case, the pin 124 would extend into a recess of the intermediate member 92 or 98, by means of a long retractable cam which would be approximately the full length of the machine. The pin 124 would in this instance keep the intermediate ram members 92, 98, used for forming window or door openings, engaged with the top flight of the belt until said members emerge from the other end of the machine.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. Apparatus for forming building panels comprising a frame having a mold chamber, a hopper on the frame for feeding a moldable material to said chamber, means mounted for movement through the chamber adapted for molding of a panel thereabout into a form including a facing portion and ribs extending from said facing portion, and ram means extending into the chamber for advancing the material therein, said first means comprising an endless belt having one flight traveling longitudinally of said chamber, said belt comprising a plurality of plates hingedly connected in end-to-end relation to provide a bottom for the chamber and cleats mounted upon the respective plates and spaced to permit flowing of the material into the spaces between adjacent cleats for forming said ribs, said one flight of the belt traveling in a path paralleling that in which the ram means is shifted, said ram means including channels extending parallel to the path of movement of said flight for permitting passage of the cleats through the ram means, there being a row of cleats on each of said plates, the cleats of the row being spaced apart transversely of the mold chamber to define longitudinal ribs on the panel, said cleats of one row being spaced from the cleats of adjacent rows, whereby to define spaces between adjacent rows of cleats for the molding of transverse ribs on the panel, said ram means including a plurality of ram members, one at least of said members being separable from the remaining members so as to be movable the length of the chamber with the top flight of the belt and thus define in the completed panel an opening in the facing portion.

2. Apparatus for forming building panels comprising a frame having a mold chamber, a hopper on the frame for feeding a moldable material to said chamber, means mounted for movement through the chamber adapted for molding of a panel thereabout into a form including a facing portion and ribs extending from said facing portion, and ram means extending into the chamber for advancing the material therein, said first means comprising an endless belt having one flight traveling longitudinally of said chamber, said belt comprising a plurality of plates hingedly connected in end-to-end relation to provide a bottom for the chamber and cleats mounted upon the respective plates and spaced to permit flowing of the material into the spaces between adjacent cleats for forming said ribs, said one flight of the belt traveling in a path paralleling that in which the ram means is shifted, said ram means including channels extending parallel to the path of movement of said flight for permitting passage of the cleats through the ram means, there being a row of cleats on each of said plates, the cleats of the row being spaced apart transversely of the mold chamber to define longitudinal ribs on the panel, said cleats of one row being spaced from the cleats of adjacent rows, whereby to define spaces between adjacent rows of cleats for the molding of transverse ribs on the panel, said ram means including a plurality of ram members, one at least of said members being separable from the remaining members so as to be movable the length of the chamber with the top flight of the belt and thus define in the completed panel an opening in the facing portion, said ram means including detent means releasably interengaging said one member with the remaining members.

3. Apparatus for forming building panels comprising a frame having a mold chamber, a hopper on the frame for feeding a moldable material to said chamber, means mounted for movement through the chamber adapted for molding of a panel thereabout into a form including a facing portion and ribs extending from said facing portion, and ram means extending into the chamber for advancing the material therein, said first means comprising an endless belt having one flight traveling longitudinally of said chamber, said belt comprising a plurality of plates hingedly connected in end-to-end relation to provide a bottom for the chamber and cleats mounted upon the respective plates and spaced to permit flowing of the material into the spaces between adjacent cleats for forming said ribs, said one flight of the belt traveling in a path paralleling that in which the ram means is shifted, said ram means including channels extending parallel to the path of movement of said flight for permitting passage of the cleats through the ram means, there being a row of cleats on each of said plates, the cleats of the row being spaced apart transversely of the mold chamber to define longitudinal ribs on the panel, said cleats of one row being spaced from the cleats of adjacent rows, whereby to define spaces between adjacent rows of cleats for the molding of transverse ribs on the panel, said ram means including a plurality of ram members, one at least of said members being separable from the remaining members so as to be movable the length of the chamber with the top flight of the belt and thus define in the completed panel an opening in the facing portion, the belt including detent means releasably interengaging said one member with a belt for conjoint movement of said one flight of the belt with said one ram member through the length of the chamber.

4. Apparatus for forming building panels comprising a frame having a mold chamber, a hopper on the frame for feeding a moldable material to said chamber, means mounted for movement through the chamber adapted for molding of a panel thereabout into a form including a facing portion and ribs extending from said facing portion, and ram means extending into the chamber for advancing the material therein, said first means comprising an endless belt having one flight traveling longitudinally of said chamber, said belt comprising a plurality of plates hingedly connected in end-to-end relation to provide a bottom for the chamber and cleats mounted upon the respective plates and spaced to permit flowing of the material into the spaces between adjacent cleats for forming said ribs, said one flight of the belt traveling in a path paralleling that in which the ram means is shifted, said ram means including channels extending parallel to the path of movement of said flight for permitting passage of the cleats through the ram means, there being a row of cleats on each of said plates, the cleats of the row being spaced apart transversely of the mold chamber to define longitudinal ribs on the panel, said cleats of one row being spaced from the cleats of adjacent rows, whereby to define spaces between adjacent rows of cleats for the molding of transverse ribs on the panel, said ram means including a plurality of ram members, one at least of said members being separable from the remaining members so as to be movable the length of the chamber with the top flight of the belt and thus define in the completed panel an opening in the facing portion, the belt including detent means releasably interengaging said one member with the belt for conjoint movement of said one flight of the belt with said one ram member through the length of the chamber, said last-named means comprising retractably mounted pins on the belt normally spring biased into engagement with said one member.

5. Apparatus for forming building panels comprising a frame having a mold chamber, a hopper on the frame for feeding a moldable material to said chamber, means mounted for movement through the chamber adapted for molding of a panel thereabout into a form including a facing portion and ribs extending from said facing portion, and ram means extending into the chamber for advancing the material therein, said first means comprising an endless belt having one flight traveling longitudinally of said chamber, said belt comprising a plurality of plates hingedly connected in end-to-end relation to provide a bottom for the chamber and cleats mounted upon the respective plates and spaced to permit flowing of the material into the spaces between adjacent cleats for forming said ribs, said one flight of the belt traveling in a path paralleling that in which the ram means is shifted, said ram means including channels extending parallel to the path of movement of said flight for permitting passage of the cleats through the ram means, there being a row of cleats on each of said plates, the cleats of the row being spaced apart transversely of the mold chamber to define longitudinal ribs on the panel, said cleats of one row being spaced from the cleats of adjacent rows, whereby to define spaces between adjacent rows of cleats for the molding of transverse ribs on the panel, said ram having means to form an opening in the facing portion of the completed panel, said apparatus further including a steam supply means adapted for directing steam into said material within the chamber, the blocks having perforations through which said steam may be supplied to said chamber, said ram means having passages through which additional steam is supplied to the chamber, the steam supply means comprising a plurality of supply pipes extending to the plates of the belt, said plates having openings registering with said pipes during movement of the belt and the blocks having openings in registration with those of the plates, for direction of the steam into the blocks and for passage of the steam out of the perforations of the blocks, said blocks further having openings in communication with the passages of the ram means for direction of a portion of the steam through the blocks into said passages.

6. Apparatus for forming building panels comprising a frame having a mold chamber, a hopper on the frame for feeding a moldable material to said chamber, means mounted for movement through the chamber adapted for molding of a panel thereabout into a form including a facing portion and ribs extending from said facing portion, and ram means extending into the chamber for advancing the material therein, said first means comprising an endless belt having one flight traveling longitudinally of said chamber, said belt comprising a plurality of plates hingedly connected in end-to-end relation to provide a bottom for the chamber and cleats mounted upon the respective plates and spaced to permit flowing of the material into the spaces between adjacent cleats for forming said ribs, said one flight of the belt traveling in a path paralleling that in which the ram means is shifted, said ram means including channels extending parallel to the path of movement of said flight for permitting passage of the cleats through the ram means, there being a row of cleats on each of said plates, the cleats of the row being spaced apart transversely of the mold chamber to define longitudinal ribs on the panel, said cleats of one row being spaced from the cleats of adjacent rows, whereby to define spaces between adjacent rows of cleats for the molding of transverse ribs on the panel, said ram means including a plurality of ram members, one at least of said members being separable from the remaining members so as to be movable the length of the chamber with the top flight of the belt and thus define in the completed panel an opening in the facing portion, the belt including detent means releasably interengaging said one member with the belt for conjoint movement of said one flight of the belt with said one ram member through the length of the chamber, said last-named means comprising retractably mounted pins on the belt normally spring biased into engagement with said one member, the frame including cam means adapted to temporarily bias said pins into engagement with the ram member for linking the ram member and belt for conjoint movement during the period within which said pin is engaged with the ram member.

References Cited in the file of this patent

UNITED STATES PATENTS

| | | |
|---|---|---|
| 805,324 | Robin-Langlois | Nov. 21, 1905 |
| 845,146 | Thomann | Feb. 26, 1907 |
| 980,144 | Cowley | Dec. 27, 1910 |
| 1,908,640 | Dunn | May 9, 1933 |
| 2,271,058 | Binns | Jan. 27, 1942 |
| 2,648,262 | Croston | Aug. 11, 1953 |
| 2,717,420 | Roy | Sept. 13, 1955 |